Patented May 6, 1952

2,595,679

UNITED STATES PATENT OFFICE 2,595,679

CRYSTALLIZATION PROCESS

Baak W. Lew, Arden, Del., assignor to Atlas Powder Company, Wilmington, Del., a corporation of Delaware No Drawing. Application November 3, 1950, Serial No. 194,030

9 Claims. (Cl. 260—75)

This invention relates to a process of crystallization, and more particularly to a process for the crystallization of water insoluble, linear polyesters which in their molten state are viscous liquids, and which tend to super cool to balsam-like resins at room temperature instead of crystallizing readily into their stable crystalline form.

It is the object of this invention to provide a novel process for the rapid conversion of amorphous masses of viscous, crystallizable, water insoluble linear polyesters into crystalline granular masses.

A further object is to provide a novel process for the rapid conversion of amorphous ethylene glycol fumarate polyester into a crystalline granular mass, readily grindable to any desired degree of fineness.

The above and other objects will become more apparent in the course of the following description of the invention and the appended claims.

The objects enumerated are accomplished by bringing a crystallizable, water insoluble linear polyester which tends to super cool badly below its melting point of from 90° to 110° C. and which is a viscous liquid in its molten state to a temperature below the melting point of its crystalline form but not more than about 30° C. below such melting point; and subjecting the viscous mass to kneading action in the presence of added water. The water is preferably added in increments, the total amount used ranging upwards from about 5% based on the weight of said polyester. The presence of very small amounts of water in the viscous crystallizing mass, even though it is incompatible therewith, has the unexpected effect of greatly decreasing its apparent viscosity and facilitating the kneading action. In addition, the water absorbs the heat of crystallization of the polyester by volatilization, thereby hastening the crystallization without unduly lowering the temperature.

The process of the invention is particularly adaptable to the crystallization of certain polyesters of fumaric acid and will be described in more detail in connection with such crystallization.

The physical and chemical properties of resinous linear polyesters of dicarboxylic acid and lower glycols have been extensively studied in recent years because of the importance of these resins in numerous commercial applications. A particularly useful group of resins in this broad class is that which comprises lower glycol polyesters of alpha unsaturated, alpha beta dicarboxylic acids and more particularly the lower glycol polyesters of maleic and fumaric acid. In general, such resins are of balsam-like consistency at ordinary temperatures and cannot be crystallized or converted into a granular form. In contrast to the behavior of most of the resins of the class the stable form at room temperature of ethylene glycol fumarate polyester and the fumarate polyester of other symmetrical, ether-oxygen free glycols such, for example, as trimethylene glycol, neopentyl glycol and the like, is apparently crystalline; and the crystallized resins, under certain conditions, are sufficiently friable that they may be ground to a free flowing granular form. The advantages of a free-flowing granular resin over a sticky balsam-like resinous mass in commercial utilization are obvious. Principal among them are ease of packaging, and simplicity of quantitatively transferring weighed quantities in formulating compositions. Of the glycols which form crystallizable polyesters with fumaric acid the most important from the standpoint of availability and cost is ethylene glycol and it is in terms of ethylene glycol fumarate polyester that the invention is described. Although the stable form of ethylene glycol fumarate polyester at ordinary temperatures is crystalline, there have been difficulties in obtaining it in this form. The polyester resin is prepared at temperatures well above its melting point, and at its melting point is a viscous liquid. It tends to super cool without undergoing crystallization and in its amorphous, super-cooled condition is soft and balsam-like at ordinary temperature, essentially like the noncrystallizable glycol polyesters. On long standing, such a super cooled mass undergoes crystallization, setting up to a hard mass of microcrystals of poor friability. The time required for such spontaneous crystallization is extremely variable, and even with seeding is too long for the satisfactory production of crystalline resin on a commercial scale.

Glycol fumarate polyester resin which responds excellently to the process of the invention is readily prepared by well known methods. Ethylene glycol in about 5% stoichiometric excess and fumaric acid are heated together under agitation in an inert atmosphere first at 150° to 175° C., then at 230° to 240° C. until an acid number of less than 60 is reached. Vacuum is then applied and the temperature maintained at 230° to 240° for approximately 20 minutes during which time the excess of ethylene glycol distills off and the esterification proceeds further, producing a polyester of AN about 30. The presence of a polymerization inhibitor to prevent double bond polymerization during the esterification is recommended. 0.1% on the charge weight of hydroquinone is a suitable inhibitor. Other known inhibitors which may be used include pyrogallol and the like.

The polyester so obtained, if allowed to cool to room temperature in bulk is a soft, sticky balsam-like resin. If converted to its stable, crystalline form, whether by long standing, by crystallization from solvent, or by the process of this invention the polyester will be hard at room temperature and will exhibit a fairly sharp melting point in the temperature range of 90° to 110° C. In accordance with the present invention ethylene glycol fumarate polyester, prepared by the process described above or by any equivalent thereof, may be readily converted to a crystalline, granular, friable solid by kneading in the presence of water at a temperature within the range of from 65° C. to 110° C. It is preferred to carry out the process at above 80° C. to take advantage of the lower viscosity of the crystallizing polyester mass at higher temperatures. The upper limit of operating temperature for any particular lot of resin is, of course, the melting point of the crystalline form of that lot and may be, as indicated above, between 90° and 110° C.

The invention is more specifically illustrated by the description of the crystallization of a particular lot of resin.

80 pounds of ethylene glycol fumarate polyester, prepared by the technique hereinbefore described, and having an acid number of 28, was transferred from the reaction kettle to a 15 gallon heavy duty kneading machine of the double arm sigma blade type at a temperature of 150° C., the transfer vessel and kneading machine having first been flushed with carbon dioxide gas. Agitation was started and water was added cautiously in increments of from 8 to 16 ounces to bring the temperature down into the crystallizing range. Four such increments were so employed. Ten minutes after the first addition of water, and at a temperature of about 85° C. the appearance of the kneading mass changed from a smooth, glossy, viscous liquid to a dull-surfaced doughy mass, indicating that crystallization had set in. The mixture rapidly became very "heavy" and hard to mix. In order to maintain kneadability of the mass further increments (8 to 16 ounces) of water were added, each increment having the effect of seeming to soften the mass even though the material in process is completely insoluble in water. The temperature remained at approximately 88° C. during the crystallization, the heat of crystallization being dissipated by radiation and by volatilization of the added water. Twelve minutes after visible evidence of crystallization had been observed, at which point a total of 10 pounds of water in 12 increments had be added to the charge, the material began to lose its cohesive nature and disintegrated to a granular mass of crystal agglomerates. Agitation was stopped, and the contents of the machine were discharged for cooling to room temperature. The resulting granular mass was hard and friable with a melting of 97° C. It could readily be ground in a hammer mill to desired screen size.

The above description is illustrative only, and the invention is not limited to the specific temperatures, number of increments of water or total amount of water there employed. The addition of water to bring the polyester into the crystallizing temperature range is optional, though preferred in the interest of shortening the time of the entire process. Maintenance of temperature at or somewhat below the crystallizing temperature of the resin while kneading in the presence of water may be accomplished by any suitable means. Conflicting forces are obviously influencing the temperature of the polyester mass. The heat of crystallization and heat of mechanical working tend to raise the temperature, radiation to the atmosphere, volatilization of water, and warming of the added water tend to lower the temperature. By varying the temperature of the added water or by jacketing the kneading machine with tempered water, for example, the balance of the conflicting forces can readily be controlled to maintain the temperature within a suitable crystallizing range.

In the usual case, where the resulting product is to be ground to a dry powder, the total amount of water added is kept at the minimum required to maintain kneadability and it is added gradually, either in a continuous stream or in increments, at the minimum rate and in the minimum total amount to maintain the crystallizing mass in workable condition until the point of granulation is reached. Although the use of larger amounts of water is within the purview of the invention it will generally be found unnecessary to use more than a total of 25%, in the preferred embodiment the amount of water employed ranges from 8% to 20% of the weight of polyester being processed.

The fact that the addition of only a few per cent of water, essentially incompatible with the resin, would have the effect of greatly increasing the workability of the resin mass in a kneading machine, and tremendously accelerate the crystallization of the resin was unpredictable from any known properties of the product. If the same polyester resin is kneaded in the same way in the absence of added water, initiation of crystallization is erratic and often greatly delayed, and once started produces a plastic mass of very great cohesiveness which puts undue strain on the kneading machinery, and the process is generally unsatisfactory as a method for graining the resin.

The addition of as little as 1% of water greatly lowers the physical resistance of the mixture to the mechanical action of the kneading machine and stimulates crystal nucleation. The effect is temporary possibly because the water is lost by evaporation, and further additions of water, preferably in increments of about 1% of the charge weight, are made when the cohesiveness of the crystallizing mass increases unduly.

Variations from the specific process described hereinabove will suggest themselves to those skilled in the art and such variations are within the scope of the invention.

What is claimed is:

1. The process of converting an amorphous crystallizable linear polyester into a granular crystalline form which comprises bringing the said amorphous polyester to a temperature of not more than about 30° C. below the melting point of the crystalline form of said polyester, and subjecting it to a kneading action in the presence of added water until the polyester mass loses its cohesiveness and disintegrates into a granular solid.

2. The process of converting amorphous ethylene glycol fumarate polyester having a melting point of from 90° to 110° C. into a granular crystalline form which comprises bringing the said polyester to a temperature of not more than about 30° C. below its melting point and subjecting it to a kneading action in the presence of added water until the polyester mass loses its cohesiveness and disintegrates into a granular solid.

3. The process of claim 1 wherein the amount of water employed is from about 5% to about 25% by weight of the said polyester.

4. The process of claim 1 wherein the water is added gradually as required to maintain the kneadability of the crystallizing polyester mass.

5. The process of claim 4 wherein the water is added in small increments.

6. The process of claim 4 wherein the water is added continuously.

7. The process of converting an amorphous crystallizable glycol fumarate polyester, melting from 90° to 110° C., into a granular crystalline form which comprises bringing the said amorphous polyester to a temperature of from 65° C. to the melting point of the resin; subjecting it to a kneading action while maintaining it within that temperature range; adding water gradually as required to maintain kneadability of the mass being crystallized and continuing the kneading action in the said temperature range until the mass becomes non-cohesive and disintegrates into a granular solid.

8. The process of converting amorphous ethylene glycol fumarate polyester resin into a granular, crystalline form which comprises bringing the said polyester to a temperature within the range of from 80° C. to the melting point of the polyester; subjecting it to a kneading action while maintaining it within that temperature range; adding water as required to maintain the kneadability of the mass in increments of about 1% by weight of the polyester until a total of from 8% to 20%, based on the weight of said polyester, has been added; and continuing the kneading action in the said temperature range until the mass becomes non-cohesive and disintegrates into a granular solid.

9. The process of crystallizing molten ethylene glycol fumarate polyester which comprises subjecting the molten mass to a kneading action; cooling the mass by the incremental addition of water to a temperature within the range of from 80° C. to the melting point of the resin; adding further increments of water as required to maintain kneadability while maintaining the temperature within the said range, until a total of from 5% to 25% of water based on the polyester weight has been added; and continuing the kneading action in the said temperature range until the crystallizing mass becomes non-cohesive and disintegrates into a granular solid.

BAAK W. LEW.

REFERENCES CITED

The following references are of record in the file of this patent:

Kolb et al., Journal of Applied Physics 20, June 1949, pp. 571–575.